(12) United States Patent
Peng et al.

(10) Patent No.: US 7,611,100 B2
(45) Date of Patent: Nov. 3, 2009

(54) MOUNTING APPARATUS FOR STORAGE DEVICE

(75) Inventors: Wen-Tang Peng, Tu-Cheng (TW); Guang-Yi Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 787 days.

(21) Appl. No.: 10/952,084

(22) Filed: Sep. 28, 2004

(65) Prior Publication Data

US 2005/0116135 A1 Jun. 2, 2005

(30) Foreign Application Priority Data

Nov. 29, 2003 (CN) .................... 2003 2 0118841 U (51) Int. Cl.
*G12B 9/00* (2006.01)
(52) U.S. Cl. ................. 248/27.1; 248/316.8; 361/683; 361/685; 312/334.7; 211/47.17
(58) Field of Classification Search ............... 248/27.1, 248/27.3, 316.8, 250, 222.11, 298.1; 361/683, 361/685, 684, 727, 725; 312/334.7, 223.2, 312/334.14, 223.1; 211/47.17, 26
See application file for complete search history.

(56) References Cited

U.S. PATENT DOCUMENTS

| | | | |
|---|---|---|---|
| 4,960,384 A * | 10/1990 | Singer et al. ................. | 439/155 |
| 4,979,909 A * | 12/1990 | Andrews ..................... | 439/352 |
| 5,262,923 A | 11/1993 | Batta et al. | |
| 5,332,306 A * | 7/1994 | Babb et al. ............. | 312/334.16 |
| 5,599,080 A | 2/1997 | Ho | |
| 5,683,159 A | 11/1997 | Johnson | |
| 5,734,557 A | 3/1998 | McAnally et al. | |
| 6,299,266 B1 * | 10/2001 | Justice et al. ............ | 312/223.2 |
| 6,343,009 B1 * | 1/2002 | Liu et al. ..................... | 361/684 |
| 6,370,022 B1 * | 4/2002 | Hooper et al. .............. | 361/685 |
| 6,377,447 B1 * | 4/2002 | Boe ........................... | 361/685 |
| 6,385,036 B1 | 5/2002 | Chien | |
| 6,473,313 B1 * | 10/2002 | Chen et al. .................. | 361/801 |
| 6,614,654 B2 * | 9/2003 | Liu et al. ..................... | 361/685 |
| 6,654,240 B1 * | 11/2003 | Tseng et al. ................ | 361/685 |

(Continued)

FOREIGN PATENT DOCUMENTS

TW 264090 11/1995

*Primary Examiner*—Kimberly T Wood
(74) *Attorney, Agent, or Firm*—Zhigang Ma (57) ABSTRACT

A mounting apparatus includes a bracket (10) for receiving a storage device (90) defining a plurality of apertures (92). An aperture (126) and four holes (125) are defined in a wall (12) of the bracket. A slidable member (30) is movably attached to the wall. A retention member (50) is slidable relative to the slidable member in first direction and second directions generally perpendicular to each other. Four latches (513) are formed on the retention member. A switch member (70) is pivotally attached to the wall. When the switch member is driven outside from the aperture of the bracket by the storage device, the slidable member is urged by the switch member to move away from the switch member in the first direction, and the retention member is moved in the second direction to drive said latch through said hole for engaging in said aperture of the storage device.

20 Claims, 6 Drawing Sheets

U.S. PATENT DOCUMENTS

| | | | |
|---|---|---|---|
| 6,667,880 B2 * | 12/2003 | Liu et al. | 361/685 |
| 6,671,180 B2 * | 12/2003 | Le et al. | 361/726 |
| 6,728,109 B1 * | 4/2004 | Wu | 361/747 |
| 6,760,226 B2 * | 7/2004 | Chen | 361/725 |
| 6,771,496 B1 * | 8/2004 | Wu | 361/685 |
| 6,853,547 B2 * | 2/2005 | Williams et al. | 361/685 |
| 6,853,549 B2 * | 2/2005 | Xu | 361/685 |
| 6,885,550 B1 * | 4/2005 | Williams | 361/685 |
| 6,980,430 B2 * | 12/2005 | Su | 361/685 |
| 2004/0037049 A1 * | 2/2004 | Erickson et al. | 361/726 |
| 2004/0075978 A1 * | 4/2004 | Chen et al. | 361/685 |

* cited by examiner

MOUNTING APPARATUS FOR STORAGE DEVICE

BACKGROUND OF THE INVENTION

1. Field of the Invention

The present invention relates to a mounting apparatus, and more particularly to a mounting apparatus for a storage device.

2. Description of the Related Art

The manufacture and assembly of electronic apparatuses has become increasingly more competitive. Manufacturers continually strive to improve the design and features of electronic apparatuses yet still offer competitive prices. One such area of improvement is mounting of devices in an electronic apparatus. An electronic apparatus, such as a typical desktop computer, tower, server, and the like, usually include storage devices, such as hard disk drives, compact disk read-only memory (CD-ROM) drives, digital video disc (DVD) drives, floppy disk drives, and the like. These devices are typically added to increase the functionality of the electronic apparatus as desired by a user. However, the installation of such devices in the electronic apparatus is always labor-intensive.

For instance, the installation of a CD-ROM drive in a computer typically involves use of screws to attach the CD-ROM drive to a bracket of a computer chassis. Usually, these screws are small enough making them difficult to manipulate and install. It is laborious and time-consuming to manually manipulate the screws. Additionally, because of their small size, the screws are easier to be dropped by an assembler into the computer. Some accidental damage will occur in the computer due to impact of these moving parts, and the like causes.

To address the aforementioned problems, a plurality of mounting apparatuses is invented to reduce the number of needed screws. For example, a pair of detachable rails is attached to opposite sides of a storage device with screws. The storage device slides into and is secured to a drive bracket. However, the screws have to be removed to detach the rails from the storage device before replacing the storage device.

Another improved type of mounting apparatus without use of screws is disclosed in U.S. Pat. No. 5,599,080, which teaches a pair of mounting rails each having two horizontal projecting plug rods plugged into respective mounting holes in a storage device. An outward hook is formed on a front extension strip of each rail, for engagement with a respective retaining hole of a bracket to securely attach the storage device in the bracket. The extension strips are depressed inward to release the outward hooks from respective retaining holes, and therefore the storage device is able to be removed from the bracket. However, the storage device is apt to be unwillingly detached from the bracket due to inadvertently depressing the extension strips.

SUMMARY OF THE INVENTION

Accordingly, an object of the present invention is to provide a mounting apparatus which conveniently and securely holds a device in place.

To achieve the above object, a mounting apparatus in accordance with the present invention comprises a bracket for receiving a storage device. The storage device defines a plurality of apertures. An aperture is defined in a wall of the bracket. A plurality of holes is defined in the wall. A slidable member is movably attached to the wall of the bracket. A retention member is slidable relative to the slidable member in a first direction and a second direction generally perpendicular to the first direction. A plurality of latches is formed on the retention member. A switch member is pivotally attached to the wall of the bracket. When the switch member is located inside the bracket through the aperture of the bracket, the latches of the retention member are aligned with the holes of the bracket. When the switch member is driven outside the bracket by the storage device, the slidable member is urged by the switch member to move away from the switch member in the first direction, and the retention member is moved in the second direction to drive said latch through said hole for engaging in said aperture of the storage device.

Other objects, advantages and novel features of the present invention will be drawn from the following detailed description of a preferred embodiment of the present invention with the attached drawings, in which:

DETAILED DESCRIPTION OF THE PRESENT INVENTION

Figure 1:
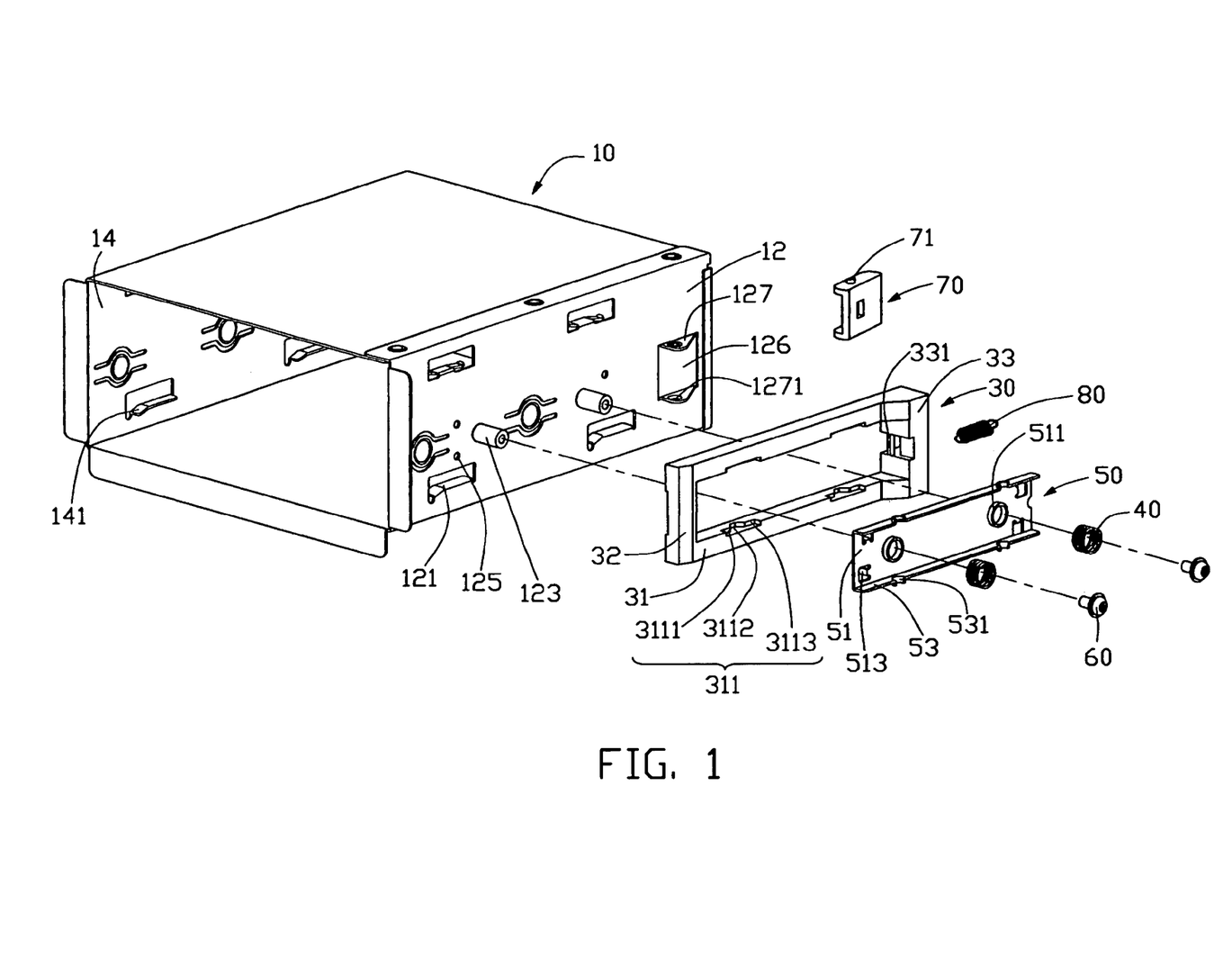
FIG. 1 is an exploded, isometric view of a mounting apparatus in accordance with a preferred embodiment of the present invention, the mounting apparatus comprising a bracket, a slidable member, a retention member and a switch member.
Figure 5:
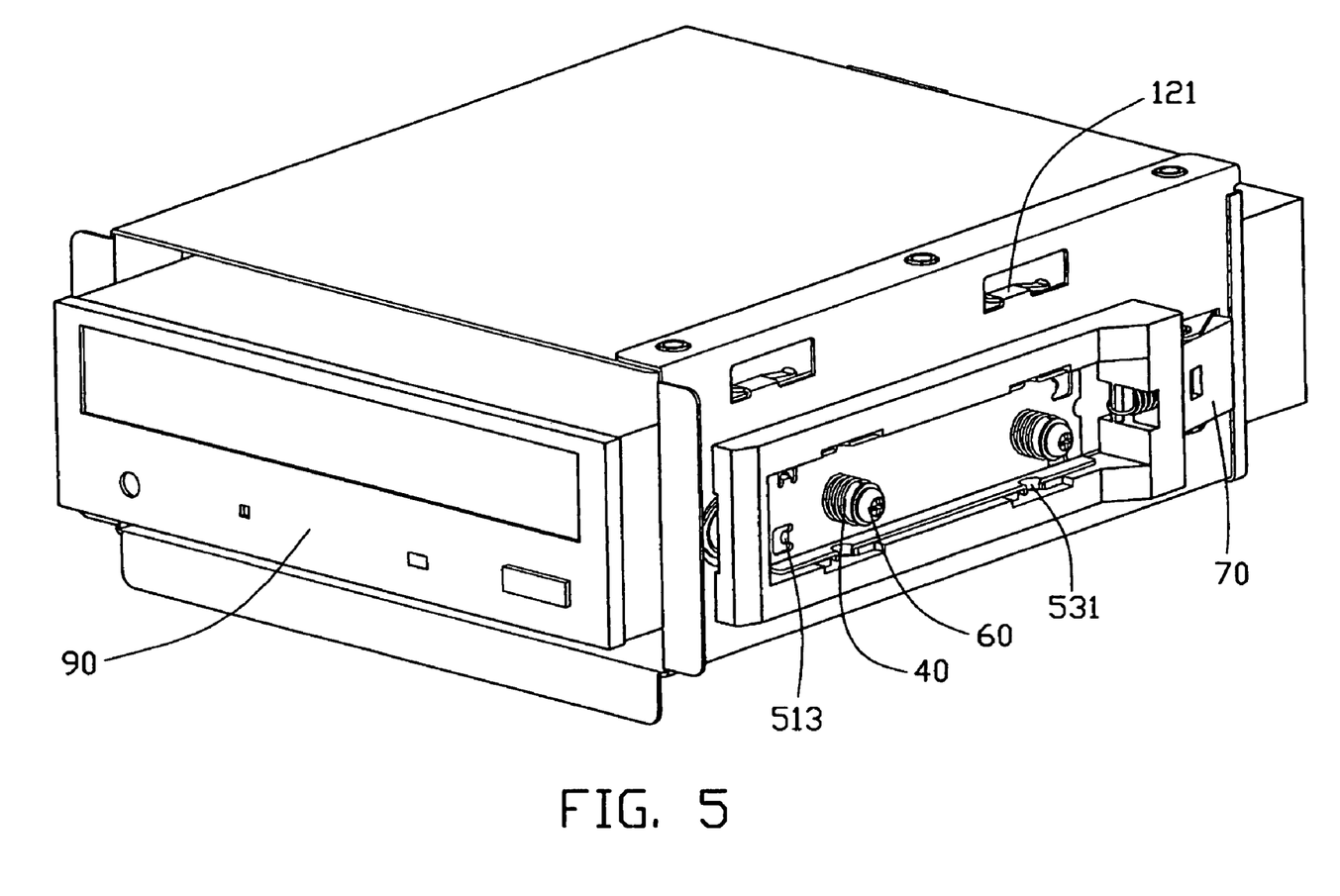
FIG. 5 is similar to FIG. 3, showing a storage device secured in the bracket, but viewed from another aspect.
Figure 6:
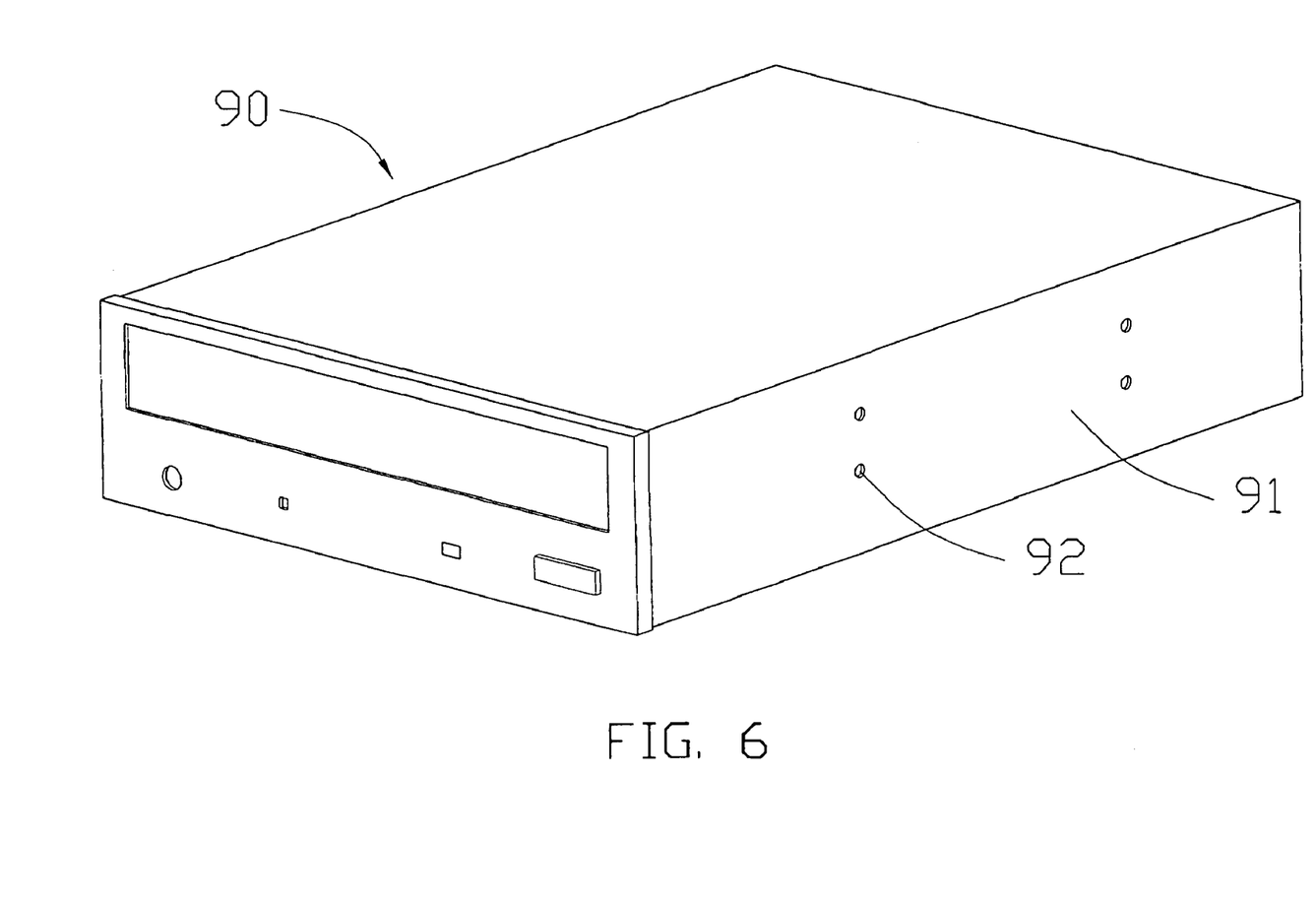
FIG. 6 is isometric view of the storage device of FIG. 5.

Referring to FIGS. 1, 5, and 6, a mounting apparatus in accordance with the preferred embodiment of the present invention is provided for holding a storage device 90 in place. The storage device 90 comprises a pair of opposite sidewalls 91. One of the sidewalls comprises a plurality of apertures 92 defined therein. The mounting apparatus comprises a bracket 10, a slidable member 30, a retention member 50 and a switch member 70.

The bracket 10 comprises a pair of opposite sidewalls 12, 14. A pair of vertically spaced rails 121, 141 is punched inwardly from respective sidewalls 12, 14, for supporting storage device 90 therebetween. Two horizontally spaced projections 123 are formed on an outer surface of the sidewall 12, each projection 123 having an internal thread. A pair of vertically spaced holes 125 is defined in the sidewall 12 adjacent to each projection 123. An aperture 126 is defined in the sidewall 12 adjacent to a rear end thereof. A pair of tabs 127 is bent perpendicularly outwardly from upper and lower extremities of the aperture 126. A pair of pivot holes 1271 is defined in the tabs 127 respectively. Two pairs of flexible flanges form in the sidewalls 12 near the top and bottom of the bracket 10 and extend into the bracket 10 to define a pathway therebetween so as to allow the device 90 to move along.

The slidable member 30 is generally a frame with a lateral opening defined therein. The slidable member 30 comprises a pair of parallel longitudinal rims 31, and a pair of slideways 311 is defined in a surface of each longitudinal rim 31 adjoining the opening. Each slideway 311 comprises a first shoulder portion 3111, an indentation 3112 and a second shoulder portion 3113. Each of the first and second shoulder portions 3111, 3113 has a vertical planar surface, and the indentation 3112 has an arcuate surface. A pair of vertical rims 32, 33 connect between two ends of the pair of longitudinal rims 31 respectively. A connecting rod 331 is formed on the vertical rim 33.

The retention member 50 comprises a rectangle plate 51, and a pair of flanges 53 extended perpendicularly outwardly from upper and lower edges of the plate 51. A pair of circular posts 511 is punched perpendicularly outwardly from the plate 51. Each post 511 defines an internal through-hole, corresponding to each projection 123 of the bracket 10. Two orthogonal latches 513 are bent inwardly from near each end of the plate 51, corresponding to apertures 92 of the storage device 90. A pair of arcuate sliding portions 531 is formed on each flange 53, corresponding to slideways 311 of the slidable member 30.

A pair of fasteners such as screws 60 is provided to attach the retention member 50 to the sidewall 12 of the bracket 10 by cooperating with a pair of resilient members such as coil springs 40.

The switch member 70 comprises a pair of pivots 71 protruding outwardly from top and bottom surfaces thereof respectively. The pivots 71 correspond to pivot holes 1271 of the bracket 10.

In assembly of the mounting apparatus, the slidable member 30 is aligned with the sidewall 12 of the bracket 10, and the projections 123 of the bracket 10 are shown out through the opening of the slidable member 30. The retention member 50 is received in the opening of the slidable member 30, with the projections 123 extended beyond the posts 511 of the retention member 50 through the through-holes thereof respectively. The sliding portions 531 of the retention member 50 are slidably engaged with corresponding slideways 311 of the slidable member 30. The screws 60 are screwed in the projections 123 of the bracket 10, and the coil springs 40 are interposed between the plate 51 of the retention member 50 and the screws 60 respectively. The switch member 70 is pivotally attached to the tabs 127 of the bracket 10. Another coil spring 80 connects between the connecting rod 331 of the slidable member 30 and the switch member 70.

Figure 2:
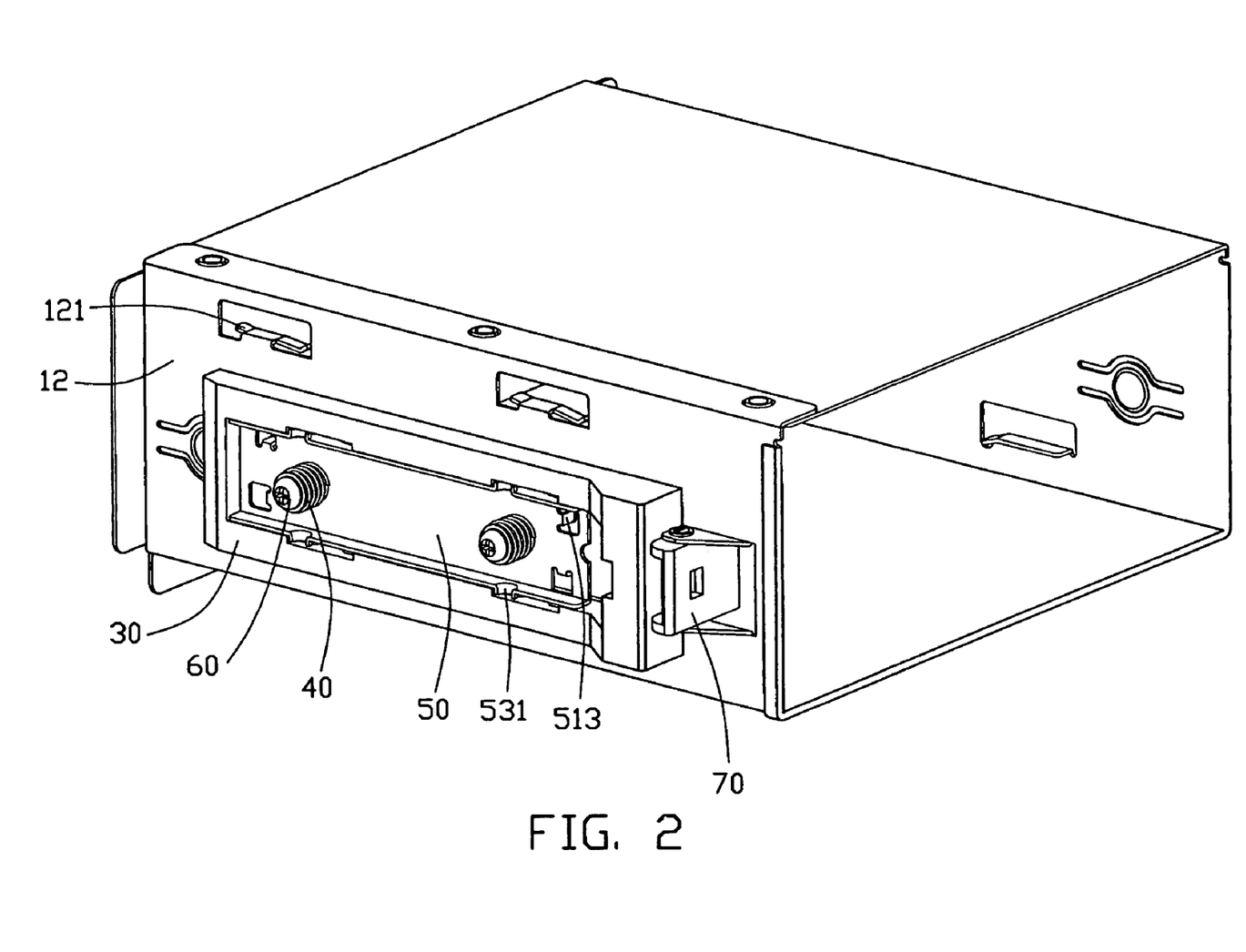
FIG. 2 is an assembled view of FIG. 1, showing the slidable member is in a first position, but viewed from another aspect.

In use of the mounting apparatus, referring particularly to FIG. 2, FIG. 2 shows the slidable member 30 is in a first position. The sliding portions 531 of the retention member 50 are engaged with the first shoulder portions 3111 of the slideways 311 of the slidable member 30 respectively, and the retention member 50 is situated farmost relative to the sidewall 12 of the bracket 10. The latches 513 of the retention member 50 are aligned with the holes 125 of the sidewall 12 respectively. The coil springs 40 are in a compressed state. The switch member 70 is generally wholly rotated inward the bracket 10 through the aperture 126 thereof, and the coil spring 80 (not visible) is in a normal state. The vertical rim 33 abuts the rest portion of the switch member 70 that stays outside the bracket 10.

Figure 3:
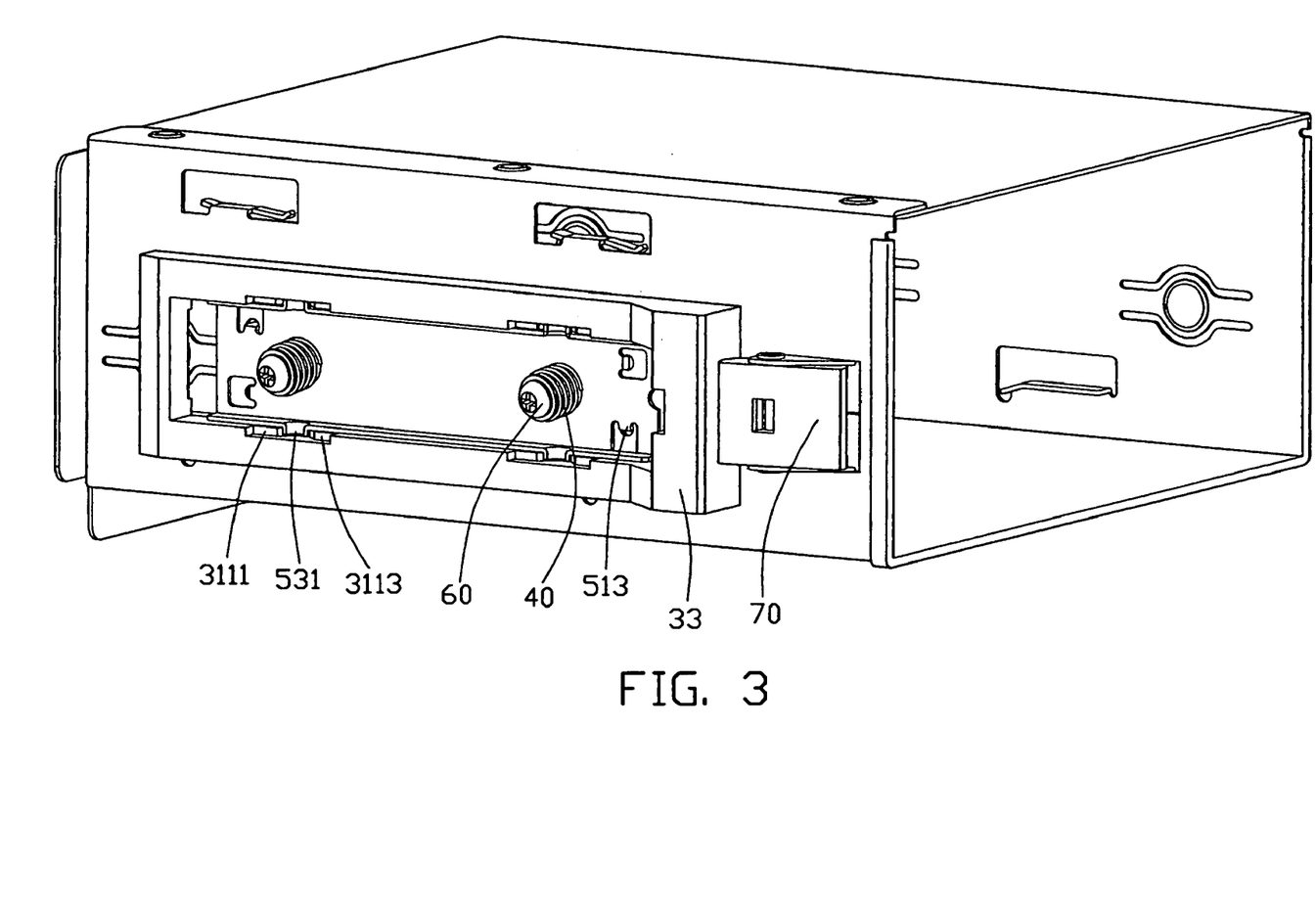
FIG. 3 is similar to FIG. 2, showing the slidable member is in a second position, but viewed from still another aspect.

The storage device 90 is then slid into the bracket 10 along the rails 121, 141. The storage device 90 contacts and gradually drives the switch member 70 to rotate outwardly until the switch member 70 is rotated generally fully out of the bracket 10, such that the switch member 70 drives the slidable member 30 forwardly to a second position shown in FIG. 3. During movement of the slidable member 30, the sliding portions 531 of the retention member 50 are relatively slid from the first shoulder portions 3111 of the slideways 311 of the slidable member 30 to the indentations 3112, and the coil springs 40 restore to push the retention member 50 toward the sidewall 12 of the bracket 10 at the indentations 3112. The latches 513 of the retention member 50 are generally fully extended into corresponding apertures 92 of the storage device 90 through corresponding holes 125 of the sidewall 12 of the bracket 10. The storage device 50 is thus fixed in the bracket 10 (see FIG. 5). The coil spring 80 is slightly stretched out.

Figure 4:
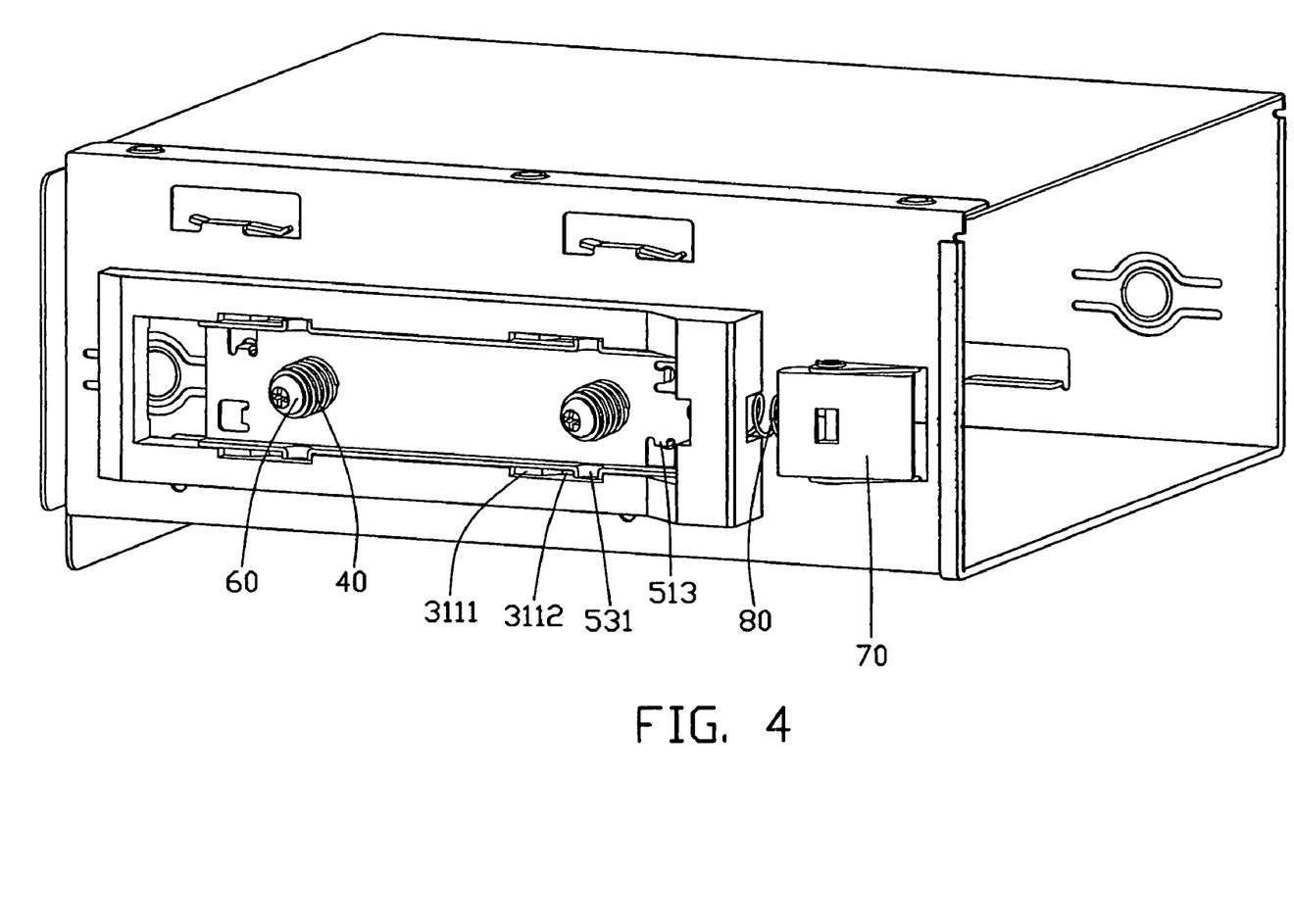
FIG. 4 is similar to FIG. 3, showing the slidable member is in a third position.

Referring to FIG. 4, to detach the storage device 90 from the bracket 10, the slidable member 30 is pushed further forwardly to a third position. The sliding portions 531 of the retention member 50 are relatively slid from the indentations 3112 of the slideways 311 of the slidable member 30 to the second shoulder portions 3113, and the latches 513 are withdrawn from the apertures 92 of the storage device 90 (not shown in FIG. 4). The coil springs 40 are compressed, and the coil spring 80 is stretched further out. The storage device 90 is then ready to be removed form the bracket 10. After the storage device 90 is removed from the bracket 10, the coil spring 80 restores to draw the slidable member 30 to the first position shown in FIG. 2.

While the present invention has been illustrated by the description of the preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A mounting apparatus for a storage device having at least one aperture defined therein, comprising:
   a bracket for receiving the storage device, an aperture defined in a wall of the bracket, at least one hole defined in the wall;
   a slidable member movably attached to the wall of the bracket;
   a retention member being slidable relative to the slidable member in a first direction and a second direction generally perpendicular to the first direction, at least one latch formed on the retention member; and
   a switch member pivotally attached to the wall of the bracket;
      wherein when the switch member is located inside the bracket through the aperture of the bracket, said latch of the retention member is aligned with said hole of the bracket; when the switch member is adapted to be driven outside the bracket by the storage device, the slidable member is urged by the switch member to move away from the switch member in the first direction, and the retention member is moved in the second direction to drive said latch through said hole for engaging in said aperture of the storage device.

2. The mounting apparatus as claimed in claim 1, wherein at least one slideway is defined in the slidable member, and at least one sliding portion is formed on the retention member corresponding to said slideway.

3. The mounting apparatus as claimed in claim 2, wherein said slideway comprises a shoulder portion and an indentation, when said sliding portion engages with the indentation, said latch of the retention member is extended generally fully through said hole of the bracket; when said sliding portion engages with the first shoulder portion, said latch of the retention member is generally fully withdrawn from said hole of the bracket.

4. The mounting apparatus as claimed in claim 1, wherein a pair of fasteners is provided to attach the retention member to the wall of the bracket.

5. The mounting apparatus as claimed in claim 4, wherein a pair of resilient members is located between the fasteners and the retention member to move the retention member in the second position.

6. The mounting apparatus as claimed in claim 5, wherein the resilient members are coil springs.

7. The mounting apparatus as claimed in claim 1, wherein a resilient member connects between the switch member and the slidable member to drive the slidable member toward the switch member.

8. The mounting apparatus as claimed in claim 7, wherein the resilient member is a coil spring.

9. A mounting apparatus comprising:
a bracket for accommodating a device having at least one aperture therein, an aperture defined in a sidewall of the bracket, at least one hole defined in the sidewall corresponding to said aperture of the device;
a retention member comprising at least one latch corresponding to said hole of the bracket;
a slidable member retained between the sidewall of the bracket and the retention member, the slidable member movable between first and second positions;
means for movably attaching the retention member to the sidewall of the bracket; and
a switch member pivotal in the aperture of the sidewall of the bracket to drive the slidable member;
wherein when the slidable member is driven from the first position to the second position, the retention member is moved toward the sidewall to extend said latch through said hole of the bracket for engaging in the storage device.

10. The mounting apparatus as claimed in claim 9, wherein the attaching means comprises a pair of fasteners and a pair of resilient members respectively retained between the fasteners and the slidable member.

11. The mounting apparatus as claimed in claim 10, wherein a pair of projections is formed on the sidewall corresponding to the fasteners.

12. The mounting apparatus as claimed in claim 11, wherein each of the fasteners is a screw, and each of the resilient members is a coil spring.

13. The mounting apparatus as claimed in claim 9, wherein two slideways are defined in parallel longitudinal rims of the slidable member respectively, and two sliding portions are formed on the retention member corresponding to the slideways.

14. The mounting apparatus as claimed in claim 13, wherein each of the slideways comprises a first shoulder portion, an indentation and a second shoulder portion.

15. The mounting apparatus as claimed in claim 9, wherein a resilient member connects between the slidable member and the switch member.

16. A mounting apparatus comprising:
a storage bracket defining a receiving space, at least one hole defined in a sidewall of the bracket;
a storage device received in the receiving space of the storage bracket by being slid in a first direction, the storage device defining at least one aperture corresponding to said hole of the storage bracket;
a switch member pivotably attached to the sidewall of the storage bracket;
a slidable member moved along the sidewall of the storage bracket between first and second positions in a second direction opposite to the first direction when the storage device pushing the switch member to move the slidable member;
a retention member having at least one latch aligned with said hole of the storage bracket; and
a resilient member moving the retention member in a third direction when the slidable member is moved in the second direction from the first position where said latch of the retention member is disengaged from the storage device to the second position where said latch of the retention member is extended through said hole of the storage bracket to engage in said aperture of the storage device thereby securely fixing the storage device in the storage bracket.

17. The mounting apparatus as claimed in claim 16, wherein a fastener is provided to attach the resilient member, the retention member and the slidable member to the sidewall of the storage bracket.

18. The mounting apparatus as claimed in claim 16, wherein the resilient member is a coil spring.

19. A mounting apparatus comprising:
a bracket defining a receiving space for accommodating a device therein;
a retention member installed to a side of said bracket; and
a switch member pivotably installed to said side of said bracket in a position next to and approachable to said retention member, said switch member being pivoted by engaging with said device in said position when said device moves into said receiving space of said bracket along a predetermined pathway in said bracket, and said switch member being pivoted to approachably engage with said retention member and result in movement of said retention member toward said device to fix said device in said receiving space of said bracket.

20. The mounting apparatus as claimed in claim 19, further comprising a slidable member slidably installed between said side of said bracket and said retention member to engage with said switch member for said retention member, said slidable member sliding along a first direction and able to urge said movement of said retention member along a second direction perpendicular to said first direction.

* * * * *

UNITED STATES PATENT AND TRADEMARK OFFICE
CERTIFICATE OF CORRECTION

PATENT NO. : 7,611,100 B2  Page 1 of 1
APPLICATION NO. : 10/952084
DATED : November 3, 2009
INVENTOR(S) : Peng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1436 days.

Signed and Sealed this

Twelfth Day of October, 2010

David J. Kappos
*Director of the United States Patent and Trademark Office*